United States Patent [19]

Lubbers

[11] 4,365,923
[45] Dec. 28, 1982

[54] COMBINATION TRAILER/LAUNCHER FOR BOATS AND OTHER VEHICLES, AND METHODS OF CONSTRUCTING AND UTILIZING SAME

[75] Inventor: Renso Lubbers, Bokellia, Fla.

[73] Assignee: Colu Industriez, Inc., Portage, Ind.

[21] Appl. No.: 126,558

[22] Filed: Mar. 3, 1980

[51] Int. Cl.³ ............................................. B60P 3/10
[52] U.S. Cl. ..................................... 414/483; 414/477; 280/414.1
[58] Field of Search ............... 414/525, 477, 786, 483; 280/475, 83, 81 R, 414 R

[56] References Cited

U.S. PATENT DOCUMENTS

| | | | |
|---|---|---|---|
| 2,808,953 | 10/1957 | Whitney | 414/477 |
| 2,856,091 | 10/1958 | Johnson | 414/483 |
| 3,069,038 | 12/1962 | Ahlbin | 414/483 |
| 3,122,245 | 2/1964 | MacKusick | 414/483 |
| 3,140,003 | 7/1964 | Horner | 414/483 X |
| 3,180,509 | 4/1965 | Caldwell | 414/483 X |
| 3,812,988 | 5/1974 | Pyle | 414/477 |

Primary Examiner—John J. Love
Assistant Examiner—L. E. Williams
Attorney, Agent, or Firm—Irving M. Weiner; Pamela S. Burt; John L. Shortley

[57] ABSTRACT

A combination trailer/launcher apparatus which includes an inner adjustable and movable frame for launching and loading a boat. The apparatus ensures that the boat will be oriented in a substantially horizontal fashion so that the boat is delivered flat into the water into which it is being launched. The boat is also constrained to travel in a horizontal fashion when being transported from a location to another location. Two separate and distinct inclines control the motion of the inner movable frame relative to the main frame of the trailer.

11 Claims, 2 Drawing Figures

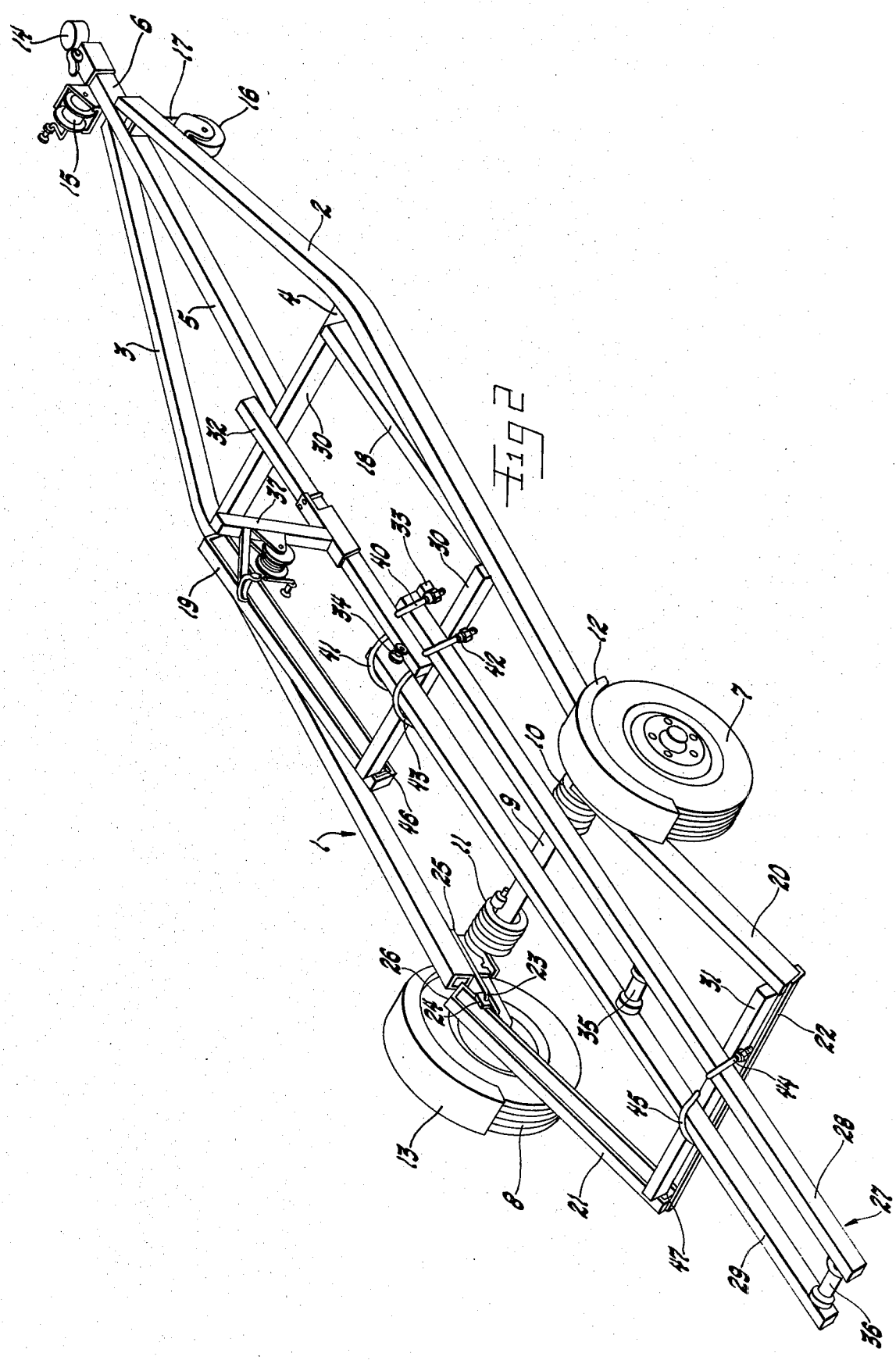

COMBINATION TRAILER/LAUNCHER FOR BOATS AND OTHER VEHICLES, AND METHODS OF CONSTRUCTING AND UTILIZING SAME

The present invention relates generally to an apparatus for selectively loading, transporting, and unloading an object, and methods of constructing and utilizing such apparatus. More particularly, the present invention relates to an apparatus which constitutes a combination trailer/launcher for boats and other vehicles, and methods of constructing and utilizing same.

BACKGROUND OF THE INVENTION

Heretofore, various attempts have been made to achieve a reliable and relatively-inexpensive combination trailer and launcher for boats and other vehicles, which would not involve or necessitate the use of many persons in order to load, transport and/or unload a boat from the trailer. Moreover, it is extremely desirable that the trailer apparatus permit the loading and unloading of the boat directly into the water while maintaining the orientation of the boat in such a fashion that the angle of introduction into or removal from the water is not inordinately steep.

To data, the above-mentioned previous attempts have fallen quite short of the mark. On the other hand, the present invention achieves the desiderata, and does so in a straight forward and relatively inexpensive fashion. The unsuccessful previous attempts are exemplified by the relevant art which is mentioned hereinbelow.

U.S. Pat. No. 3,102,649 issued in 1963 to Whalen entitled "TRAILER TILTING APPARATUS" discloses a trailer construction which provides a pivotal and longitudinally movable connection that permits the center beam to tilt with relation to the tongue. In the Whalen trailer, the center beam of the trailer allows the tongue to slide forward to pivot the trailer upward and slide backward to return the trailer to a horizontal position. The tongue is attached to the center beam by a pin which passes through a slot in the center beam and acts as the axle for a pair of rollers.

U.S. Pat. No. 3,380,607 issued in 1968 to Dale entitled "TRANSPORT EQUIPMENT" discloses a combination boat and camping trailer. The detachable boat trailer provides a pivotal and longitudinally movable connection that permits the center beam to tilt in relation to the tongue. A cross member is attached perpendicularly to the rear of the center beam. Extending from the front surface of each end of the cross member perpendicularly toward the front of the trailer is a guide, upon which are attached two supports extending perpendicularly upward from the guide. The wheel assembly is provided by beams which telescope to extend from the rear of the camping trailer frame. An axle is attached to the rear of the telescoping beams to which the wheels are mounted. The Dale boat trailer does not have a wheel assembly independent to that of the camper trailer.

U.S. Pat. No. 3,661,286 issued in 1972 to Smith entitled "VEHICLE TRAILER" discloses a trailer that provides a triangular tongue member for connecting the trailer to a towing vehicle. Each side of the tongue is attached to a beam by means of a hinge which allows the beam to tilt relative to the runners which allow a vehicle to be placed thereon. Cross members are attached perpendicularly to the runner beams where the tongue element is hinged to the trailer and at a point near the rear of the trailer. The wheel assembly is removably attached to the runner beams which allow it to be positioned for optimum handling of the load.

U.S. Pat. No. 3,945,521 issued in 1976 to Decker entitled "ROTABLE TRAILER" discloses a trailer bed which will rotate 360° and may be tilted by means of a hinged center beam. Attached to the lower frame, consisting of a center beam to which a wheel assembly is perpendicularly attached at the rear, is a circular turntable. A detachable rectangular trailer bed with wheels rotatably attached to support members on the underside of the bed engages the turntable allowing the trailer bed to rotate. Rails, boat supports, and keel rollers may be attached to the turntable for transporting motorcycles, bicycles, all-terrain vehicles, and boats. A hinge plate in the center beam allows the trailer to be tilted, and a locking mechanism forward of the hinge locks the trailer bed in a horizontal position for towing.

The present invention avoids the complexities and shortcomings of the previous attempts.

SUMMARY OF THE INVENTION

The present invention provides an apparatus for selectively loading, transporting and unloading an object. The apparatus includes first means for movably and removably supporting said object, and second means for transporting said object. The apparatus further includes third means for maintaining the first means in a first orientation which is substantially parallel to the terrain when the object is being transported. The apparatus also includes fourth means for placing the first means in a second orientation which is inclined to the terrain when the object is being loaded off of and loaded onto the apparatus. The first, second, third and forth means are operably interconnected with each other so that the first means may move relative to the second means while the second means remain stationary and also remains in its normal orientation relative to the terrain.

It is a primary object of the invention to provide an apparatus which permits the launching of a boat in a substantially horizontal orientation or in a orientation which is at a relatively small angle relative to the water surface.

It is a further object of the present invention to provide an apparatus which permits the boat or object being transported to be oriented in a substantially horizontal position when being transported or towed relative to the ground terrain.

An additional object to the present invention is to provide a combination trailer/launcher apparatus wherein the tongue of the trailer which is secured to the back of a towing vehicle remains stationary and substantially horizontal during launching and traveling of the trailer. Yet a further object of the invention is to provide an apparatus wherein there is no necessity to alter the distance between the main trailer wheels and the trailer ball hitch, which in the case of the present invention are both fixed to the tongue of the trailer.

Another object of the invention is to provide a combination trailer/launcher apparatus which is adjustable to accommodate different lengths of boat or other object being transported or launched.

A further object of the invention is to provide a trailer which has adjustable members to accommodate different hual widths of boats.

The foregoing and other objects and advantages of the present invention will become apparent from the ensuing disclosure in which a preferred embodiment is illustrated in the accompanying drawings, in which like parts or designated by like reference numerals. It is contemplated that variations in structural features and arrangement parts thereof may occur to the skilled artisan without departing from the spirit of the present invention and without sacrificing any of the advantages or objects of the present invention.

BRIEF DESCRIPTION OF THE DRAWINGS

FIG. 2 illustrates a perspective view of the FIG. 1 embodiment shown in its launching position.

DETAILED DESCRIPTION

Figure 1:
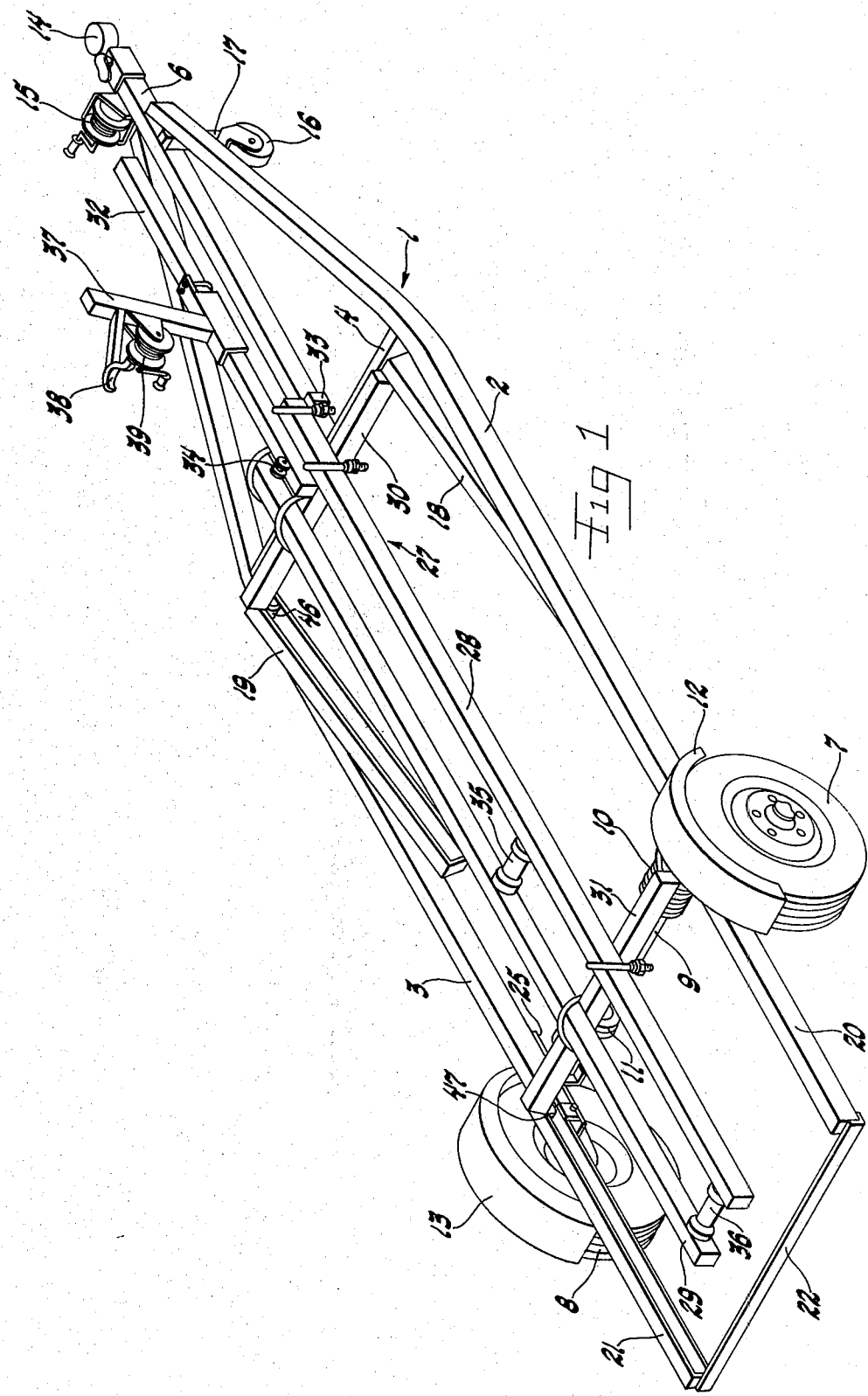
FIG. 1 illustrates a perspective view of a first embodiment of the present invention shown in its normal traveling position.

Before explaining the present invention in detail, it is to be understood that the present invention is not limited or restricted in its application to the details of construction and arrangement of parts as illustrated in the accompanying drawings, because the present invention is capable of other embodiments and of being practised or carried out in various other ways. Furthermore, it is to be understood that the phraseology, nomenclature and terminology employed herein is for the purpose of description and illustration only, and not for the purpose of restriction or limitation.

With reference to FIG. 1, there is shown a main frame 1 which includes right and left side frame members 2 and 3, a cross frame member 4, and a central front frame member 5 the forward end of which constitutes a tongue 6. These frame members are welded together to form a rigid integral frame 1.

With reference to FIGS. 1 and 2, the frame 1 is mounted upon and connected with two main trailer wheels 7 and 8 by means of an axle 9 and right and left torsion springs 10 and 11. There are provided adjacent the right and left main wheels 7 and 8, right and left mud guards 12 and 13, respectively.

At the front end of the frame 1, there is provided a ball hitch 14, a winch 15, and an adjustable wheel 16 which is adjustably connected to front central frame member 5 by means of a wheel support member 17.

Right and left front guide bars 18 and 19 are welded at a predetermined angle of inclination to the inner surfaces of right and left side frame members 2 and 3, respectively. The right and left front guide bars 18 and 19 are each formed of an opensided channel member, the purpose of which will become apparent from the description set forth hereinbelow.

At the rear of the combination trailer/launcher apparatus, right and left rear guide bars 20 and 21 are pivotably connected to the rear of frame 1. A rear cross piece 22 is welded to the rear ends of rear guide bars 20 and 21, respectively. The rear guide bars 20 and 21 are fabricated from opensided channel members similar to the channel members from which right and left front guide bars 18 and 19 are formed.

The front portions of right and left guide bars 20 and 21 pivotably rest upon associated pivot pins 23 which extend transversely from pivot plates 24, which are inturn are welded to plates 25, which are inturn welded to the rear ends of right and left side frame members 2 and 3, respectively. The extreme forward most surfaces 26 of right and left rear guide bars 20 and 21 are positioned a predetermined distance forwardly of pivot pins 23.

A movable and adjustable inner frame structure 27 includes elongated right and left side members 28 and 29, respectively, front and rear transverse frame members 30 and 31, respectively, and a central front frame member 32. The rear end of front central inner frame member 32 is welded to front transverse inner frame member 30 as well as to a front cross piece 33.

A plurality of rollers 34, 35 and 36 are rotatably supported by the inner frame structure 27 in order to support thereon a boat or other object (not shown) which is to be transported, loaded and/or unloaded when desired. A boat tie bar 37 is adjustably mounted upon the front central inner frame member 32, and such boat tie bar 37 is provided with a bow support structure 38 and a winch 39.

In order to properly support and accommodate various different sizes of boats or other objects, the elongated side inner frame members 28 and 29 are adjustably and releasably connected to front cross piece 33, front transverse inner frame member 30 and rear transverse inner frame member 21 by means of suitable adjustable fastening means, such as U-bolt assemblies 40, 41, 42, 43, 44 and 45.

Front rollers 46 depend from and are rotatably connected to the right and left ends of the front transverse inner frame member 30. These front rollers 46 are rotatably constrained to move within the channel members forming right and left front guide bars 18 and 19. With this arrangement, and in this fashion, the front transverse inner frame member 30 will translate rearwardly at the predetermined angle of inclination of guide bars 18 and 19 when the inner frame structure 27 moves rearwardly to lauch the boat or other object; and the transverse inner frame member 30 will translate forwardly up the incline of such predetermined angle guide bars 18 and 19 when the frame structure 27 moves forwardly to load the boat from the water onto the trailer apparatus.

In a somewhat similar fashion, rear guide rollers 47 depend from and are rotatably connected to the right and left sides of the rear transverse inner frame member 31. Similarly, the rear guide rollers 47 are retained within and are constrained to roll within the channel members which form the right and left rear guide bars 20 and 21. When the rear guide rollers 47 roll within rear guide bars 20 and 21, the rear transverse inner frame member 31 will translate relative to such guide bars 20 and 21. The pivot pins 23, the pivot plate 24, and the rear guide rollers 47 constitute components of an over-center roller assembly which will be explained in the description set forth hereinbelow.

As shown in FIG. 1, the rear guide bars 20 and 21 and rear cross piece 22 are normally disposed in a horizontal fashion parallel to the plane containing side frame members 2 and 3. This is the normal transporting orientation of the apparatus, and it should be noted that in this orientation the rear guide rollers 47 are in their forward most position which is disposed a predetermined distance forwardly from pivot pins 23. This over-center arrangement, in conjunction with the weight of the boat or object upon the inner frame structure 27, maintains the boat as well as the rear guide bars 20 and 21 in a horizontal orientation during the normal transporting mode of operation. In this mode the boat would be suitably tied down with its bow supported by bow support 38 and with suitable cables or lines tightly secured by means of winches 15 and 39.

When arriving at the boat launching location, which may, for example, constitute a boat launching ramp or inclined beach area, the winch 15 which would hold the cable or line supporting the bow of the boat would be loosened, and the trailer apparatus back down the launching ramp. In so doing, the inner frame structure 27 in conjunction with the boat supported thereon would be subjected to a force component which would urge the front and rear guide rollers 46 and 47 to roll rearwardly within the channel-like guide bars 18, 19, 20 and 21. Thus, the guide bars 20 and 21 pivot downwardly automatically when the rear guide rollers 47 pass over and rearwardly of pivot pins 23. Moreover, the guide bars 20 and 21 pivot downwardly in a controlled and regulated fashion which is controlled, at least in part, by the predetermined trajectory between front guide bars 18 and 19 and the front transverse inner frame member 30.

As best seen in FIG. 2, there are two separate and distinct inclines with respect to the front guide bars 18 and 19 and the rear guide bars 20 and 21. This is an important feature of the invention because of the fact that from this feature results the advantages of the boat being maintained in a substantially horizontal position while launching and loading which delivers the boat substantially flat into the water.

Furthermore, when the boat is to be loaded onto the apparatus, the winch 15 is actuated to pull the boat onto the inner frame structure 27 and thereafter to pull the combined boat and inner structure 27 onto the main frame 1. During this loading operation, the rear guide bars 20 and 21 are automatically lifted up to the horizontal shown in FIG. 1 by means of over-center roller assembly described hereinabove. In other words, when the rear guide rollers 47 roll upwardly within the channel structure of guide bars 20 and 21 and pass over and in front of the position of pivot pins 23, the guide bars 20 and 21 lift themselves up to the horizontal position automatically.

Thus, it is apparent that the present invention provides a very simple and efficient structure which permits the boat to be easily launched by loosening the winch 15 and backing the trailer down the boat ramp toward the water to be launched. The boat will thereupon be launched substantially flat into the water by means of the predetermined separate inclines provided by the front guide bars and the rear guide bars.

The boat rollers 34, 35 and 36 mentioned hereinabove are merely by way of example. The invention contemplates the use of such boat rollers, or alternatives such as various sliding devices which are occasionally used to replace boat rollers.

I claim:

1. An apparatus for selectively loading and transporting and unloading an object comprising:
    a main frame having means for transporting said apparatus;
    a second frame for supporting an object, said second frame being movably supported by said main frame;
    said main frame comprising a forward section and a guide bar frame pivotally connected to said forward section for pivotal movement about an axis transverse of said forward section and pivotal movement with respect to said second frame transverse of said second frame;
    means movably supporting said second frame on said guide bar frame for movement of said second frame longitudinally of said main frame and along said guide bar frame transversely of said axis with said means movably supporting said second frame on said guide bar frame being movable from a location forwardly of said axis to a locations rearwardly thereof;
    whereby upon movement of said second frame longitudinally relative to said main frame, said guide bar frame will pivot downwardly with respect to said forward section of said main frame when said means movably supporting said second frame on said guide bar frame moves rearwardly of said axis and said guide bar frame will pivot upwardly with respect to said forward section when said means movably supporting said second frame moves forwardly of said axis; and
    means supporting said second frame on said forward sections of said main frame for movement along said forward section of said main frame simultaneously with movement of said second frame along said guide bar frame and while said guide bar frame pivots downwardly with respect to said forward section, whereby said second frame is supported by and moves along said forward section of said main frame while said second frame moves along said guide bar frame as the latter pivots.

2. The apparatus for selectively loading, transporting and unloading an object of claim 1, wherein:
    said guide bar frame comprises a pair of channels; and
    there are means movably supporting said second frame in said pair of channels.

3. The apparatus of claims 1 or 2, wherein:
    said guide bar frame is pivotally mounted on said forward section of said main frame adjacent to the forward ends of said channels.

4. The apparatus of claim 2 wherein said second frame comprises a member extending transversely of said main frame and including:
    roller means affixed to the latter said member;
    said roller means supporting said second frame in said guide bar frame channels.

5. The apparatus of claims 1 or 2 including:
    said main frame comprising a plate supported thereon;
    means pivotally supporting said guide bar frame on said plate.

6. The apparatus of claim 1, including:
    a second guide bar frame supported on said first frame; and
    there are means movably supporting said second frame on said ground guide bar frame for movement therealong longitudinally of said main frame.

7. The apparatus of claim 6, wherein:
    said second guide bar frame comprises a pair of channels; and
    there are means movably supporting said second frame in said pair of channels.

8. The apparatus of claims 6 or 7, including:
    said second guide bar frame being supported at an acute angle with respect to said main frame.

9. The apparatus of any one of claims 6 or 7, wherein:
    said second frame comprises a member extending latterly thereof and there are roller means connected to the latter member supporting said second frame on said second guide bar frame.

10. The apparatus of claim 9, including:

said second guide bar frame being positioned longitudinally along said main frame with respect to the first mentioned guide bar frame.

11. An apparatus for selectively loading, transporting and unloading an object comprising:

a frame (1) having means for transporting an object;

said frame comprising members (2-3) forming a first frame section and a guide bar section (2-21) forming a rearwardly extending continuation of said first frame section;

a second frame (27) for supporting an object, said second frame being supported in part by said first frame section (2-3) and in part by said guide bar section (20-21);

said guide bar section being pivotally connected (23) to said first frame section for pivotal movement with respect to said first frame section (2-3) about an axis (23) transverse of said first frame section (2-3) and pivotal movement with respect to said second frame about an axis transverse of said second frame (27);

means (47) movably supporting a portion of said second frame (27) on said guide bar section (20-21) for movement of said second frame (27) longitudinally of said first frame section (2-3) and along said guide bar section (20-21) transversely of said axis (23—23) with said means (47) movably supporting said second frame on said guide bar section being movable from a location transversely forwardly (26) of said axis (23) to a location rearwardly thereof (22);

means (46) movably supporting a portion of said second frame (27) on said first frame section (2-3) for supported movement therealong during movement of said second frame along said guide bar frame section;

whereby upon movement of said second frame (37) longitudinally relative to said first frame section (2-3) and along said guide bar section (20-21), the portion of said guide bar section (20-21) rearwardly of said axis will pivot upwardly with respect to said first frame section (2-3) when means movably supporting said second frame (27) on said guide bar section (20-21) moves forwardly (26) of said axis (23); and said second frame (27) will be supported by said guide bar section (20-21) and by said first frame section (2-3) during movement of said second frame (27) along said guide bar section during pivotal movement of said guide bar section.

* * * * *